United States Patent [19]

Schilling

[11] Patent Number: 5,377,223

[45] Date of Patent: Dec. 27, 1994

[54] NOTCH FILTERING A SPREAD SPECTRUM SIGNAL USING FOURIER SERIES COEFFICIENTS

[75] Inventor: Donald L. Schilling, Sands Point, N.Y.

[73] Assignee: InterDigital Technology Corporation, Wilmington, Del.

[21] Appl. No.: 113,138

[22] Filed: Aug. 30, 1993

[51] Int. Cl.$^5$ .............................................. H04K 1/00
[52] U.S. Cl. .......................................... 375/1; 380/38
[58] Field of Search ............................... 375/1; 380/38

[56] References Cited

U.S. PATENT DOCUMENTS

| | | | |
|---|---|---|---|
| 3,571,767 | 3/1971 | Bush | 333/76 |
| 3,794,920 | 2/1974 | Darrow | 325/105 |
| 4,425,642 | 1/1984 | Moses et al. | 370/76 |
| 4,425,661 | 1/1984 | Moses et al. | 375/1 |
| 4,426,630 | 1/1984 | Folkmann | 333/174 |
| 4,450,417 | 5/1984 | Folkmann | 333/24 |
| 4,797,923 | 1/1989 | Clarke | 375/1 |
| 4,914,674 | 4/1990 | Kimber et al. | 375/1 |
| 4,965,539 | 10/1990 | Korber, Jr. | 333/202 |
| 5,029,184 | 7/1991 | Andren et al. | 375/1 |
| 5,161,168 | 11/1992 | Schilling | 375/1 |
| 5,177,768 | 1/1993 | Crespo et al. | 375/1 |
| 5,180,999 | 1/1993 | Edwards | 333/175 |
| 5,185,762 | 2/1993 | Schilling | 375/1 |
| 5,218,618 | 6/1993 | Sagey | 375/1 |
| 5,228,053 | 7/1993 | Miller et al. | 375/1 |
| 5,315,583 | 5/1994 | Murhphy et al. | 375/1 |

Primary Examiner—David C. Cain
Attorney, Agent, or Firm—David Newman & Associates

[57] ABSTRACT

A transmitter and receiver for spread spectrum communications using a Fourier series coefficients module, a notch gate, a fast Fourier transform module, and memory. The Fourier series coefficient module generates magnitude and phase values of a Fourier series. The notch gate notches the Fourier series coefficients at selected bands of frequencies. The selected band of frequencies are chosen so as not to provide interference with a preexisting user such as a cellular user, microwave user, or other radio communications. The fast Fourier transform generates from the notched Fourier series coefficients a spreading signal. The spreading signal has notches in its spectrum so as not to cause interference with the preexisting users. At the transmitter, the spreading signal is used to spread-spectrum process message data to generate a spread-spectrum signal for transmitting over a communications channel. At the receiver, the spreading signal is used to despread a receive spread-spectrum signal. At the receiver, the receive spread-spectrum signal has the advantage that the preexisting users are notched out and not part of the despread signal and therefore not part of the interference in the receiver detection circuits.

46 Claims, 5 Drawing Sheets

NOTCH FILTERING A SPREAD SPECTRUM SIGNAL USING FOURIER SERIES COEFFICIENTS

BACKGROUND OF THE INVENTION

This invention relates to spread-spectrum communications and more particularly a method and apparatus which allows, overlaying over pre-existing users, a spread-spectrum system which notch filters by deleting Fourier series coefficients.

DESCRIPTION OF THE RELEVANT ART

Pseudo random, also called pseudo noise (PN), sequences are the basis of spreading in direct sequence spread-spectrum systems. The PN sequences are binary and therefore give rise to a (sin X)/X frequency spectrum. Since the spread-spectrum systems are bandlimited, filtering is employed and the resulting PN sequence is no longer binary, and the cross correlation properties of the code may change.

In a cellular overlay system, an additional problem arises. The overlay operation often requires establishing notches in the spectrum of the transmit and receive waveforms in the base station and sometimes in the remote unit. The notch filter should be capable of notching many signals simultaneously and be adaptive so that the frequencies to be notched can change rapidly. The resulting waveforms are often distorted, requiring additional compensation circuitry. The result is often a complex subsystem which limits its applicability for operation in a remote unit.

SUMMARY OF THE INVENTION

A general object of the invention is a spread-spectrum system which can overlay cellular systems or a microwave system or other radio communications systems having a bandwidth which is less than the bandwidth of the spread-spectrum system.

Another object of the invention is to provide notches in the bandwidth of a spread-spectrum signal for reducing interference with cellular, microwave or other radio communications.

According to the present invention, as embodied and broadly described herein, a method is provided for generating, from a pseudo-noise (PN) sequence, a spread-spectrum signal, with the spectrum of the spread-spectrum signal having at least one notch at a selected band of frequencies. The method comprises the steps of generating a plurality of Fourier series coefficients from the PN sequence, and generating a first modified set of the plurality of Fourier series coefficients by deleting, corresponding to each selected band of frequencies, a subset of the plurality of Fourier series coefficients. The method generates from the modified set of Fourier series coefficients a spreading signal. At the transmitter, the method spread-spectrum processes message data with the spreading signal, and transmits the spread-spectrum-processed message data as the spread-spectrum signal over a communications channel. At the receiver, the method uses the spreading signal to despread a received spread-spectrum signal, and detects message data in the despread spread-spectrum signal.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Reference now is made in detail to the present preferred embodiments of the invention, examples of which are illustrated in the accompanying drawings, wherein like reference numerals indicate like elements throughout the several views.

The present invention notch filters a spread-spectrum signal by using Fourier series coefficients for a transmitter and a receiver. Broadly, a pseudo-noise (PN) sequence is used to generate a spread-spectrum signal. The spectrum of the spread-spectrum signal has at least one notch at a selected band of frequencies. By selected band of frequencies is meant those frequencies which are notched from the spectrum of the spread-spectrum signal. The selected band of frequencies typically are those frequencies used by pre-existing users such as cellular system users and microwave system users. The selected band of frequencies may be at a single frequency, or at a plurality of frequencies. Additionally, the selected band of frequencies may be contiguous, or interspersed in the spectrum of the spread-spectrum signal.

Transmitter

One embodiment of the transmitter includes means for generating a first plurality of Fourier series coefficients from the PN sequence, and means for generating a first modified set of the first plurality of Fourier series coefficients. The first modified set of the first plurality of Fourier series coefficients is generated by deleting a subset of the first plurality of Fourier series coefficients at locations corresponding to each selected band of frequencies. Using the first modified set of the Fourier series coefficients, the transmitter includes means for generating a first spreading signal. Also provided are means for spread-spectrum processing message data with the first spreading signal, and means for transmitting the spread-spectrum-processed message data as the spread-spectrum signal over a communications channel. The communications channel may be radio wave propagation through space, as might be encountered in a personal communication or cellular system in a city or other geographic area. Alternatively, the communications channel may be cable, with the notches placed for preexisting users or channels on the cable.

Generally, the Fourier series coefficients are generated with each coefficient having a magnitude value and a phase value. Equivalently, the Fourier series coefficients may be generated with each value having an in-phase value and a quadrature value.

The spread-spectrum processing means may be embodied as a device which modulo adds the message data with the first spreading signal, or equivalently, a device which multiplies the message data with the first spreading signal. Alternatively, the spread-spectrum processing means may include means for outputting the first spreading signal when the message data has a 1-bit, and outputting a complement of the first spreading signal when the message data has a 0-bit. Alternatively, the data may be filtered by a Nyquist filter and then multiplied by the spreading signal.

The present invention is not limited to using a single PN sequence. The present invention may be adapted for using a plurality of PN sequences. The present invention is taught by way of example, using a first PN sequence and a second PN sequence. Thus, the transmitter may further include means for generating from the second PN sequence a second plurality of Fourier series coefficients. Similarly, means would be provided for generating a second modified set of the second plurality of Fourier series coefficients by deleting a subset of the second plurality of Fourier series coefficients at each selected band of frequencies. The transmitter would include means for generating from the second modified set of Fourier series coefficients a second spreading signal, and the spread-spectrum-processing means would spread-spectrum process message data with the first spreading signal and the second spreading signal.

Assume that pairs of bits, i.e., two bits at a time, are used to trigger sending the first spreading signal, a complement of the first spreading signal, a second spreading signal, and a complement of the second spreading signal. When the message data has a first pair of bits, the spread-spectrum-processing means outputs the first spreading signal. When the message data has a second pair of bits, with the second pair of bits different from the first pair of bits, the spread-spectrum processing means outputs a complement of the first spreading signal. When the message data has a third pair of bits, with the third pair of bits different from the first pair of bits and the second pair of bits, the spread-spectrum-processing means outputs the second spreading signal. When the message data has a fourth pair of bits, with the fourth pair of bits different from the first pair of bits, the second pair of bits and the third pair of bits, the spread-spectrum-processing means would output a complement of the second signal.

Alternatively, a 1-bit and a 0-bit can be used to trigger sending the first spreading signal or the second spreading signal. Thus, when the message data has a 1-bit, the spread-spectrum processing means outputs the first spreading signal, and when the message data has a 0-bit the spread-spectrum processing means outputs the second spreading signal.

The present invention may be extended to more sequences, such as a third PN sequence and a fourth PN sequence and for recognizing further sets of bits.

Figure 1:
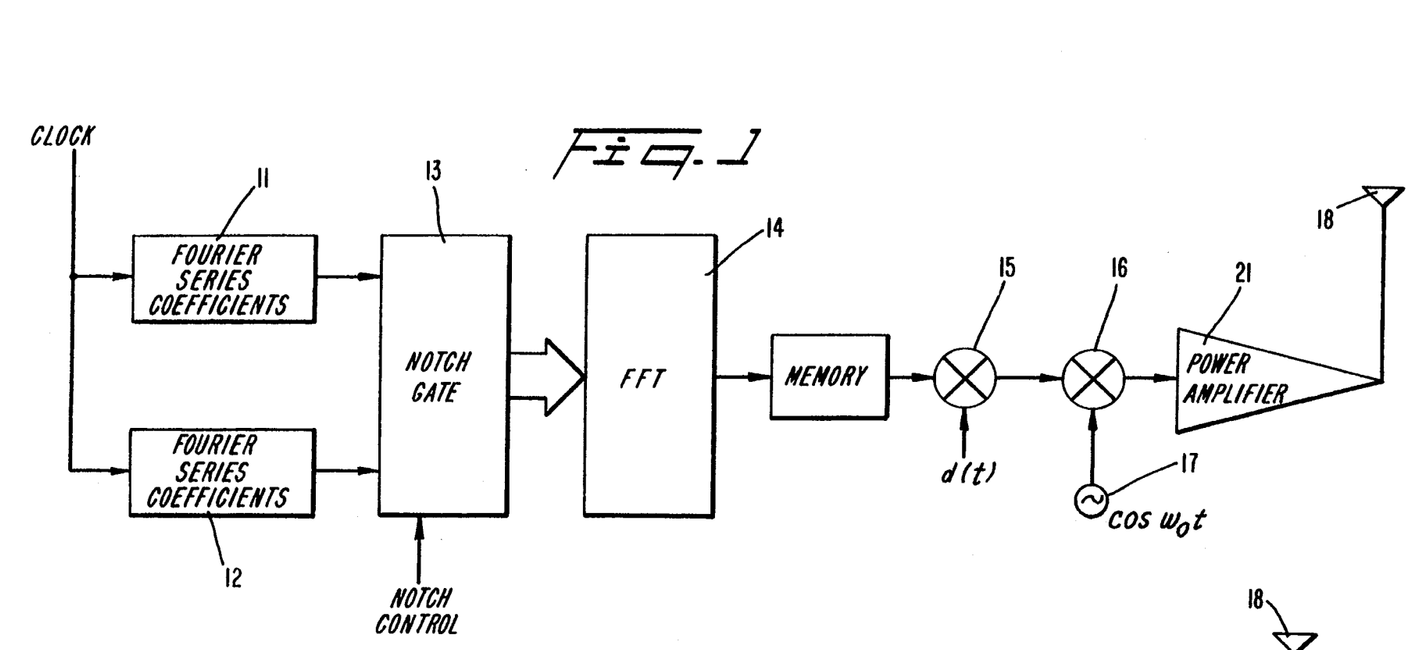
FIG. 1 is a block diagram of a transmitter.

In the exemplary arrangement shown in FIG. 1, the means for generating a first plurality of Fourier series coefficients is shown as Fourier series coefficients module 11 and Fourier series coefficients module 12. The means for generating a modified set of the first plurality of Fourier series coefficients is illustrated as notch gate 13. The means for generating the first spreading signal is illustrated as fast Fourier transform (FFT) module 14. The means for transmitting the spread-spectrum-processed message data is illustrated as product device 15, product device 16, oscillator 17, power amplifier 21, and antenna 18.

The Fourier series coefficients module 11 and Fourier series coefficients module 12 are coupled to a clock, and to the notch gate 13. The FFT module 14 is coupled between the notch gate 13 and the product device 15. A memory 19, such as random access memory (RAM), may be inserted between FFT module 14 and product device 15. The purpose of the memory is to store time samples of the periodic FFT waveform. Thus, the FFT need only be used to update the memory, when the notch control changes. The message data d(t) may be filtered prior to multiplication, so as to limit frequencies above a Nyquist frequency, as is well known in the art. The product device 15 is coupled between a data source for message data d(t) and to the product device 16. The product device 16 is coupled to the oscillator 17 and the power amplifier 21. The power amplifier 21 is coupled to the antenna 18.

The Fourier series coefficient modules 11, 12 generate Fourier series coefficients of the PN sequence. The PN sequence, by its nature of being periodic, avails itself to a Fourier series expansion, representing the signal. The Fourier series coefficients appear at the reciprocal of the repetition rate of the PN sequence. For example, assuming that the PN sequence repeats every $T_b$ seconds, the Fourier series has coefficients appearing in the frequency domain every $1/T_b$ Hz.

Generally, a clock drives Fourier series coefficients module 11 and Fourier series coefficient module 12. Fourier series coefficient module 11 might generate the magnitude value, and Fourier series coefficient module 12 might generate a phase value. Equivalently, Fourier series coefficient module 11 and Fourier series coefficient module 12 might generate corresponding in-phase values and quadrature values.

The means for generating a first modified set of the first plurality of Fourier series coefficients is illustrated as notch gate 13. Notch gate 13 is driven by notch control. The notch control determines where notches are to be placed at the selected bands of frequencies. The notch control may receive its information from an outside source, such as: AMPS base station; a table of users; energy measurement techniques. The mobile user's notches preferably are down loaded from the base station and transferred to hardware in the mobile unit.

The means for generating a first spreading signal is embodied as a FFT module 14. The FFT could be a FFT chip, a DSP chip or any other technique, well known in the art to generate a Fourier transform. The FFT module 14 generates a first spreading signal from the Fourier series coefficients. The first spreading signal is a time signal. The means for spread-spectrum processing is embodied as a product device 15. The product device 15 spread-spectrum processes message data with the first spreading signal. The resulting signal out of product device 15 is spread-spectrum-processed message data. The spread-spectrum-process message data are raised to a carrier frequency, $\omega_0$, by cooperation of product device 16 and oscillator 17, as a spread-spectrum signal. The spread-spectrum signal is amplified by power amplifier 21 and radiated by antenna 18.

Figure 2:
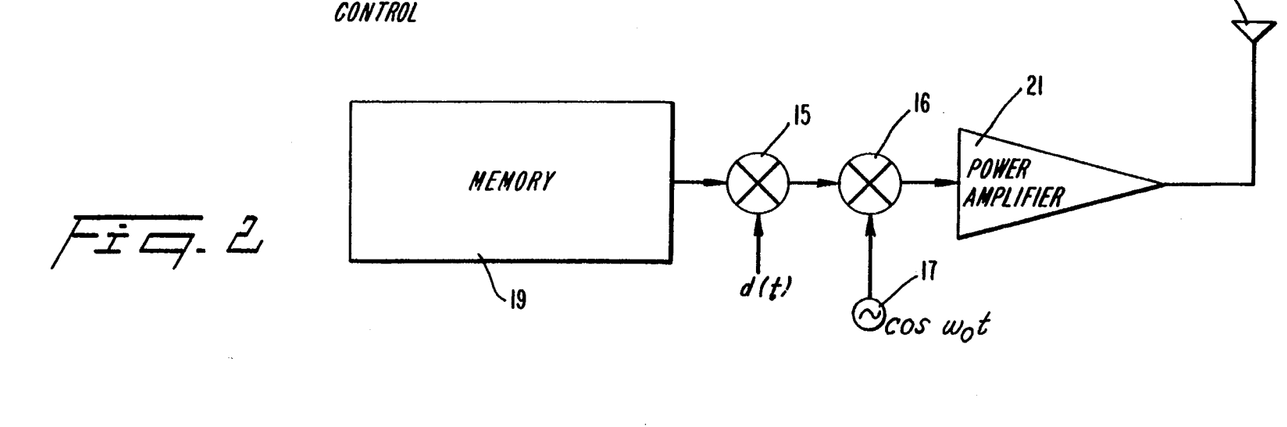
FIG. 2 is a block diagram of an alternative transmitter.

Alternatively, as shown in FIG. 2, the transmitter may use a memory 19 which stores either the first spreading signal, or the first modified set of the first plurality of the Fourier series coefficients. Thus, the first modified set of the first plurality of the Fourier series coefficients may be determined at an earlier point in time, either at the transmitter or at another location. The first modified set of the first plurality of the Fourier series coefficients or the first spreading signal would be stored in memory 19, and be used to spread-spectrum process message data d(t) by product device 15. The advantage of the transmitter shown in FIG. 2 is that the first spreading signal has preset the notches at the selected band of frequencies, and time is not required to process the first modified set of the first plurality of Fourier series coefficients. The transmitter of FIG. 2 may not be as responsive, however, to a changing environment. The transmitter of FIG. 2 may be more dynamic and responsive to a changing environment by having the FFT module 14 output time samples of the modified spreading sequence to a memory 19, inserted between FFT module 14 and product devices 15 of FIG. 1. The FFT module 14 would calculate a new modified set of Fourier series coefficients when the notches change, and store the new time samples of the resulting sequence in memory 19.

The Fourier series coefficients may be generated one time, since the waveform for the Fourier series coefficients is periodic. Then, the output of FFT module 14 can be sampled at two, three, or four times the maximum bandwidth, B/2. If the PN sequence repeats after a time $LT_c$, and there are 4 samples each B/2, then there are $(LT_c) \times 4(B/2) = 2LT_cB$ samples. For example, if $f_c = 8 \times 10^6$ chips/seconds, B=10 MHz, L=10,000, then $$N_{samples} = 2 \times 10^4 \times \frac{10^{-6}}{8} \times 10^7 = 25,000.$$

Assuming that each sample is an 8-bit word, then 25,000, 8-bit, samples can be stored in a random access memory (RAM). The notch gate 13 can change the samples as the notch positions need to be changed. Having stored samples in RAM can be a lot faster than computing each time with the FFT module 14.

Although not shown, it is well known in the art that the first spreading signal and a complement of the first spreading signal may be stored in the memory 19. The product device 15 could be embodied as a switching device, for switching the output from the first spreading signal to the complement of the first spreading signal. Thus, for example, when the message data have a 1-bit, the switching device outputs the first spreading signal, and when the message data have a 0-bit, the switching device outputs the complement of the first spreading signal.

The present invention may be extended to use more than one PN sequence. In the latter case, means for generating a second PN sequence could be embodied as Fourier series module 11 and Fourier series module 12, for generating the respective magnitude value and phase value of the second plurality of Fourier series coefficients. The notch gate 13 would notch the spectrum of the second plurality Fourier series coefficients at the selected band of frequencies to thereby generate the second modified set of the second plurality of Fourier series coefficients. The notch gate 13 would notch the spectrum by deleting at each selected band of frequencies, a subset of the second plurality of Fourier series coefficients to generate the second modified set of the second plurality of Fourier series coefficients. Further, the FFT module 14 generates from the second modified set of the second plurality of Fourier series coefficients the second spreading signal, and the spread-spectrum processing means spread-spectrum processes message data d(t) with the first spreading signal and the second spreading signal.

When spread-spectrum processing a first spreading signal and a second spreading signal, a switching device might output the first spreading signal, a complement of the first spreading signal, the second spreading signal, and the complement of the spread spectrum signal, depending on the sense of bits coming from message data d(t). Assume that the switching device 15 is triggered on pairs of bits of the message data d(t), and that a first pair of bits, a second pair of bits, a third pair of bits and a fourth pair of bits are each different from each other. Thus, by way of example, when the message data d(t) have a first pair of bits, the switching device 15 might output the first spreading signal. When the message data d(t) have a second pair of bits, the switching device might output a complement of the first spreading signal. When the message data d(t) have a third pair of bits, the switching device might output the second spreading signal. When the message data d(t) have a fourth pair of bits, the switching device might output the complement of the second spreading signal. The switching between the various first spreading signal, complement of the first spreading signal, second spreading signal and complement of the second spreading signal, is done at the slow data rates of the message data d(t), not the switching rates of the PN sequences.

Alternatively, if complements of the first spreading signal and complement of the second spreading signal were not to be used, the switching device 15 might output the first spreading signal when the message data d(t) have a 1-bit and output the second spreading signal when the message data d(t) have a 0-bit.

Similarly, referring to FIG. 2, the first spreading signal, the complement of the first spreading signal, the second spreading signal, and the complement of the second spreading signal, or equivalently the first modified set of Fourier series coefficients, and the second modified set of Fourier series coefficients can be stored in memory 19, and outputted to switching device 15 as previously described. The triggering of which signal is outputted from memory 19 can be accomplished as previously described.

The concept may be extended to any number of PN sequences. Thus, by way of example, for using a third PN sequence and a fourth PN sequence, a third plurality of Fourier series coefficients and a fourth plurality of Fourier series coefficients could be generated. The notch gate 15 can generate a third modified set of Fourier series coefficients from the third plurality of Fourier series coefficients by deleting, at each selected band of frequencies, a subset of the third spreading plurality of Fourier series coefficients. A third spreading signal can be generated from the third modified set of Fourier series coefficients using FFT module 14. Similarly, the notch gate 13 can generate a fourth modified set of Fourier series coefficients from the fourth plurality of Fourier series coefficients by deleting, at each selected band of frequencies, a subset of the fourth plurality of Fourier series coefficients. The FFT module 14 can generate a fourth spreading signal from the fourth modified set of Fourier series coefficients.

Using the first spreading signal, the second spreading signal, the third spreading signal, and the fourth spreading signal, the switching device 15 can trigger any of the spreading signals depending on the message data d(t). Assuming that the sets of bits each include three bits, one might have: a first set of bits; a second set of bits which are different from the first set of bits; a third set of bits which are different from the first set of bits and the second set of bits; a fourth set of bits which are different from the first set of bits, the second bits and the third set of bits; a fifth set of bits which are different from the first set of bits, the second set of bits, the third set of bits and the fourth set bits; a sixth set of bits which are different from the first set of bits, the second set of bits, the third set of bits, the fourth set of bits, and the fifth set of bits; a seventh set of bits which are different from the first of bits, the second set of bits, the third set of bits, the fourth set of bits, the fifth set of bits and the sixth set of bits; and, an eighth set of bits which are different from the first set of bits, the second set of bits, the third set of bits, the fourth set of bits, the fifth set of bits, the sixth set of bits and the seventh set of bits. Thus, the switch device 15 outputs the first spreading signal when the message data d(t) have the first set of bits. When the message data d(t) have the second set of bits, the switching device 15 outputs a complement of the first spreading signal. When the message data d(t) have the third set of bits, the switching device outputs the second spreading signal. When the message data d(t) have the fourth set of bits, the switching outputs a complement of the second spreading signal. When the message data d(t) have the fifth set of bits, the switching device outputs the third spreading signal. When the message data d(t) have the sixth set of bits, the switching device 15 outputs a complement of the third spreading signal. When the message data d(t) have the seventh set of bits, the switching device 15 outputs the fourth spreading signal. When the message data d(t) have the eighth set of bits, the switching device 15 outputs a complement of the fourth set of bits.

Alternatively, complements need not be used and a simpler system could be implemented by having the switching device 15 outputs the first spreading signal when the message data d(t) have the first set of bits, output the second spreading signal when the message data d(t) have the second set of bits, output the third spreading signal when the message data d(t) have the third set of bits, and output the fourth spreading signal when the message data d(t) have the fourth set of bits. In the above example, the signal outputted from the switching device is transmitted as the spread-spectrum signal.

Figure 3:
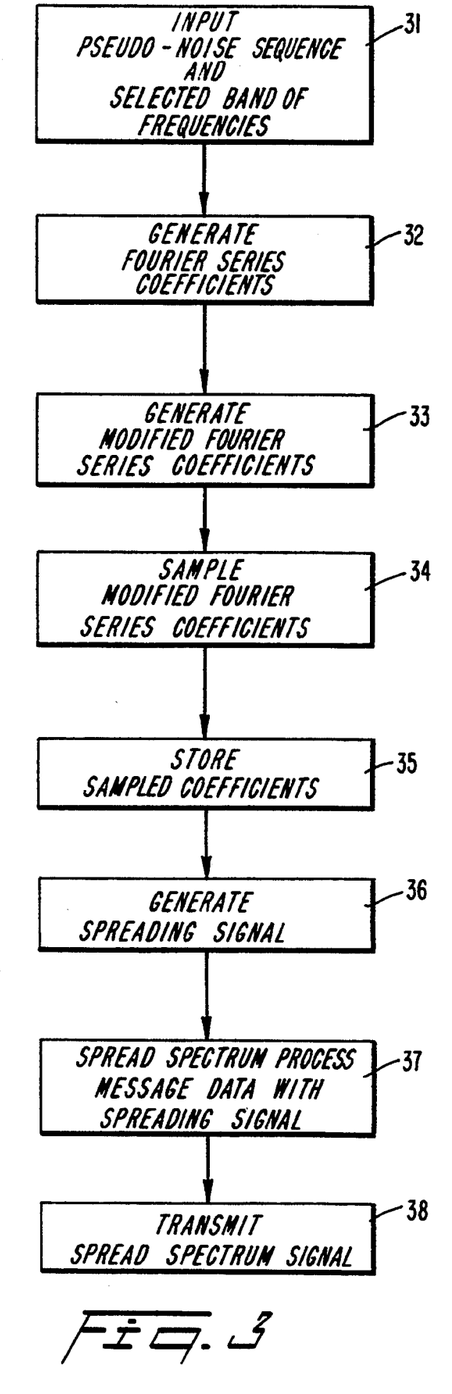
FIG. 3 is a flowchart of the transmitting method.

As shown in FIG. 3, the present invention also includes a method for generating a spread-spectrum signal having a bandwidth with at least one notch at a selected band of frequencies. The method broadly comprises the steps of inputting 31 a PN sequence, and inputting 31 the selected band of frequencies which are to be notched. The method generates 32 a first plurality of Fourier series coefficients from the PN sequence, and generates 33 a first modified set of the first plurality of Fourier series coefficients. The modified set is generated 33 by deleting at each selected band of frequencies, a subset of the first plurality of Fourier series coefficients. The method optionally may sample 34 and store 35 the first modified set of Fourier series coefficients in a memory. The method generates 36 from the first modified set of the Fourier series coefficients a first spreading signal, and spread-spectrum processes 37 the message data d(t) with the first spreading signal. The spread-spectrum-processed message data is transmitter 38 as the spread-spectrum signal over a communications channel, as previously described.

The method may be extended to using a second plurality of Fourier series coefficients or more as previously described.

Receiver

The present invention provides notch filtering interference received along with a spread-spectrum signal, using a modified spread spectrum generator having Fourier series coefficients for a receiver. The receiver, as described herein, may be used as a stand-a-lone item or with the transmitter. The receiver does not require that it be used with the previously described transmitter, and the previously described transmitter need not be used with the receiver of the present invention.

One embodiment of the receiver includes means for generating a first plurality of Fourier series coefficients from the PN sequence, and means for generating a first modified set of the first plurality of Fourier series coefficients. The modified set of the first plurality of Fourier series coefficients is generated by deleting, at corresponding locations to each selected band of frequencies, a subset of the first plurality of Fourier series coefficients. Using the first modified set of Fourier series coefficients, the receiver includes means for generating a first spreading signal. The receiver includes means for despreading a received spread-spectrum signal with the first spreading signal, and means for detecting message data within the despread spread-spectrum signal.

Similar to the transmitter, the Fourier series coefficients are generated with each coefficient having a magnitude value and a phase value. Equivalently, the Fourier series coefficients may be generated with each value having an in-phase value and a quadrature value.

The despreading means may be embodied as a device which multiplies the received spread-spectrum signal with the first spreading signal. The despreading may be performed at radio frequencies (RF), intermediate frequencies (IF) or baseband frequencies. Alternatively, the despreading means may include means for outputting the 1-bit when the message data has a first spreading signal and outputting a 0-bit when the message data has a complement of the first spreading signal.

The present invention is not limited to using a single PN sequence. The receiver may be adapted for using a plurality of PN sequences, for the case when a received spread-spectrum signal was spread-spectrum processed with a plurality of PN sequences. The present invention is taught, by way example, for a second PN sequence. Thus, the receiver may further include means for generating from the second PN sequence a second plurality of Fourier series coefficients. Similarly, means would be provided for generating a second modified set of the second plurality of Fourier series coefficients by deleting, at each selected band of frequencies, a subset of the second plurality of Fourier series coefficients. The receiver would include means for generating from the second modified set of the second plurality of Fourier series of coefficients a second spreading signal. The despreading means would despread the received spread-spectrum signal with the first spreading signal and the second spreading signal. When the received spread-spectrum signal has the first spreading signal, the spread-spectrum processing means would output the first pair of bits as message data. When the received spread-spectrum signal has the complement of the first spreading signal, the despreading means would output a second pair of bits as message data. When the received spread-spectrum signal has a second spreading signal, despreading means would output the third pair of bits as message data signal. When the received spread-spectrum signal has a complement of the second spreading signal, the despreading means would output a fourth pair of bits as message data. The second spreading signal preferably might be orthogonal to the first spreading signal.

Alternatively, when the received spread-spectrum signal has the first spreading signal, the despreading means could output a 1-bit, and when the received spread-spectrum signal has a second spread signal, despreading means would output the 0-bit.

The present invention may be extended to more sequences, such as a third PN sequence and a fourth PN sequence and for recognizing further sets of bits.

Figure 4:
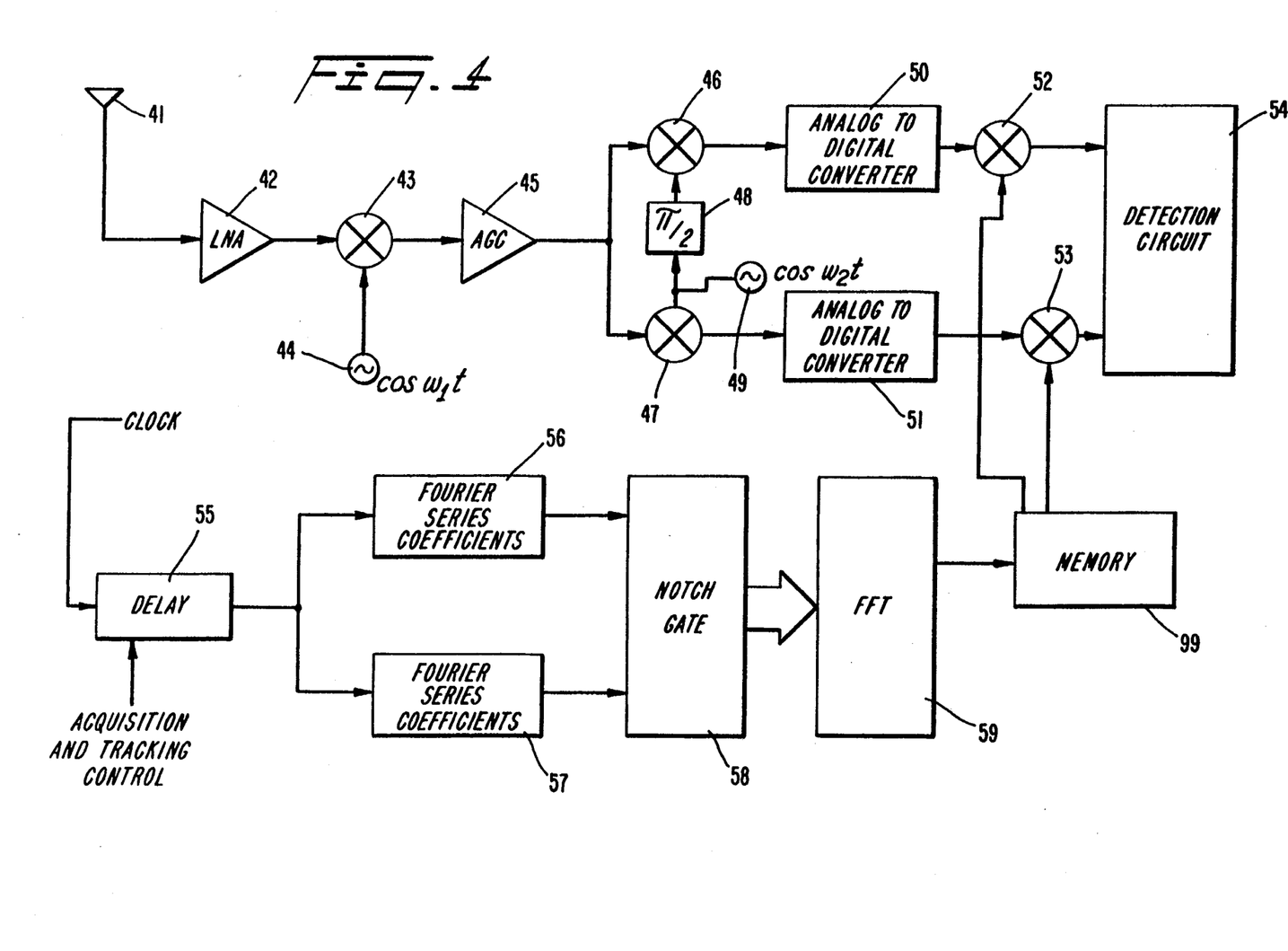
FIG. 4 is a block diagram of a receiver.

In the exemplary arrangement shown in FIG. 4, the means for generating a first plurality of Fourier series coefficients is shown as Fourier series coefficients module 56 and Fourier series coefficients module 57. The means for generating a modified set of the first plurality of Fourier series coefficients is illustrated as notch gate 58. The means for generating the first spreading signal is illustrated by the fast Fourier transform (FFT) module 59. Note that in practice the FFT output can be sampled and stored in RAM and clocked since the FFT output is periodic. The FFT module is then used whenever a change is needed.

The means for despreading may be an analog or digital spread-spectrum receiver, and may use product devices or matched filters. The means for despreading the received spread-spectrum signal as message data is illustrated, by way of example, as product devices 52, 53. The Fourier series coefficients module 56 and Fourier series coefficients module 57 are coupled to a clock through a delay module 55, and to the notch gate 58. The FFT module 59 is coupled between the notch gate 58 and the product devices 52, 53. The product devices 52, 53 are coupled between analog to digital converters 50, 51 and to the detection circuit 54. Mixers 46, 47 are coupled between signal source 49, phase shifter 48, analog to digital converters 50, 51 and automatic gain control (AGC) circuit 45. Mixer 43 is coupled between signal source 44 and low noise amplifier (LNA) 42. The LNA 42 is coupled to antenna 41. Generally, a clock, controlled by delay 55, drives Fourier series coefficients module 56 and Fourier series coefficients module 57.

The means for generating a first modified set of the first plurality of Fourier series coefficients is illustrated as notch gate 58. Notch gate 58 is driven by notch control. The notch control determines where notches are to be placed at selected bands of frequencies. The Fourier series coefficients, magnitude and phase, would come from Fourier series coefficients module 56 and Fourier series coefficients module 57. Equivalently, the Fourier series coefficients module 56 and Fourier series coefficients module 57 could generate in-phase coefficients and quadrature values of the Fourier series coefficients.

The means for generating a first spreading signal is embodied as a fast Fourier transform (FFT) module 59. The FFT module performs an inverse Fourier transform of the Fourier series coefficients, to generate a first spreading signal. The first spreading signal is a time signal. The means for despreading is embodied as mixers 52, 53. The mixers 52, 53 despread a received spread-spectrum signal with the first spreading signal. The resulting signal out of mixers 52, 53 is detected by detection circuit 54 as message data. The received spread-spectrum signal is mixed from a carrier frequency $\omega_0$ to baseband, by cooperation of mixers 43, 46, 47, and oscillators 44, 49. The received spread-spectrum signal is received by antenna 41 and amplified by low noise amplifier 42.

Figure 5:
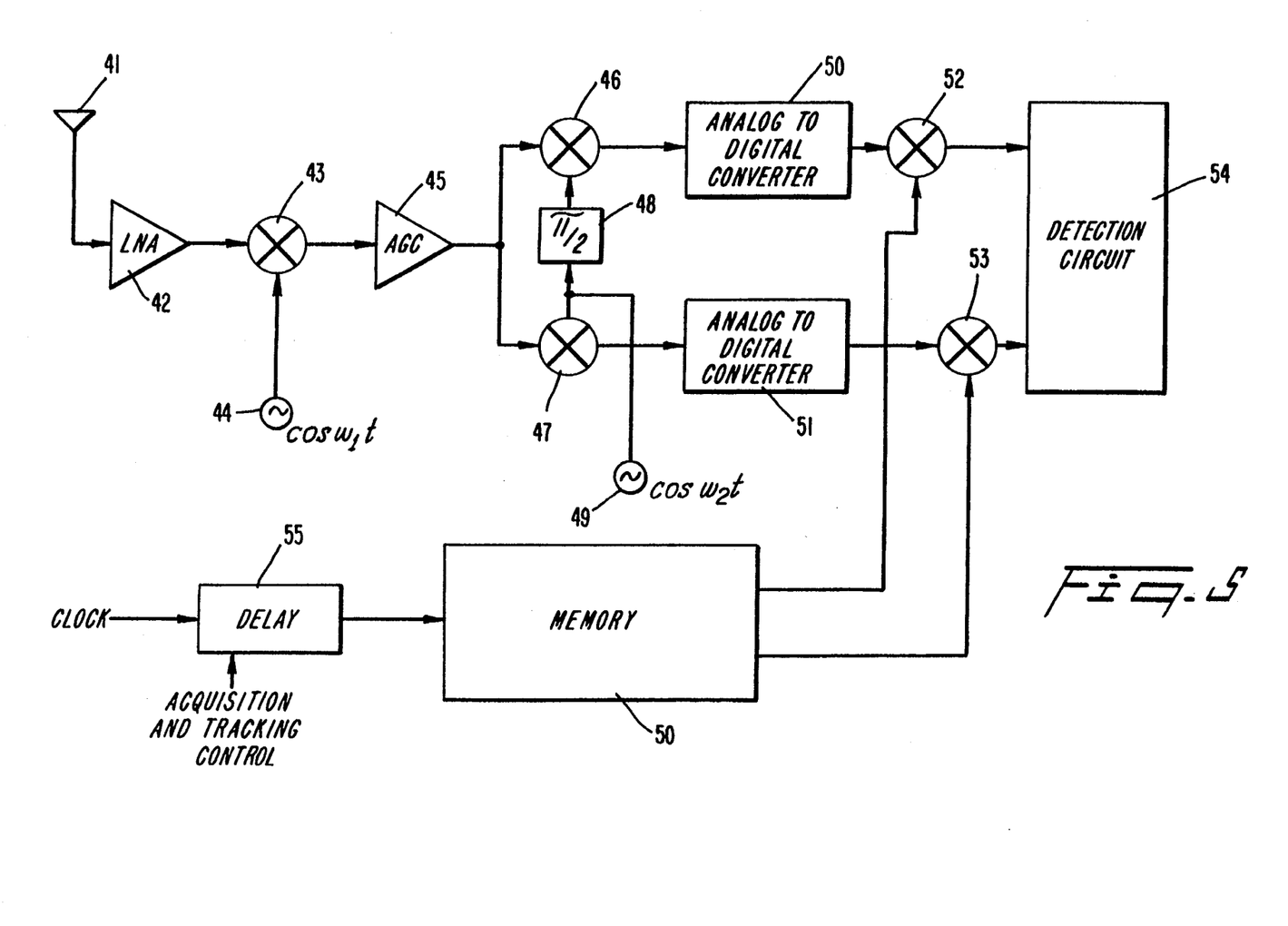
FIG. 5 is a block diagram of an alternative receiver.

Alternatively, as illustratively shown in FIG. 5, the receiver may use a memory 50 which stores samples of either the first spreading signal, or the first modified set of the first plurality of the Fourier series coefficients. The memory 50 is coupled to delay 55, which is triggered by acquisition and tracking control circuitry. Thus, the first modified set of the first plurality of the Fourier series coefficients may be determined at an early point in time, either at the receiver or at another location. The modified set of the first plurality of the Fourier series coefficients or the first spreading signal would be stored in memory 50, and be used by mixers. The advantage of FIG. 5 is that the first spreading signal has preset the notches at selected band of frequencies, and time is not required to process the first modified set of the first plurality of Fourier series coefficients. The receiver of FIG. 5 may not be dynamic, i.e., it may not be responsive to a changing environment. The receiver of FIG. 5 may be more dynamic and responsive to a changing environment by having the FFT module 59 output modified sets of Fourier series coefficients to a memory 99, inserted between FFT module 59, and mixer 52, 53 of FIG. 4. In this case, the modified sets of Fourier series coefficients would be calculated by FFT module 59 in advance. The FFT module 59 would calculate a new set of Fourier series coefficients when the notches change. Although not shown, it is clear that the operation can be performed using RF or IF processing rather then digital processing.

Although not shown, it is well known in the art that the first spreading signal and a complement of the first spreading signal may be stored in the memory 50. The mixers 52, 53 could be embodied as a switching device, for switching the output in response to the first spreading signal to the complement of the first spreading signal, as a 1-bit and a 0-bit. Thus, for example, when the received spread-spectrum signal has the first spreading signal, the switching device outputs a 1-bit and when the received spread-spectrum signal has the complement of the first spreading signal, the switching device outputs the 0-bit.

The present invention may be extended to use more than one PN sequence. In the latter case, means for generating a second PN sequence could be embodied as Fourier series module 56 and Fourier series module 57, for generating the respective magnitude value and phase value of the second plurality of Fourier series coefficients. The notch gate 58 notches the spectrum of the second plurality Fourier series coefficients to generate the second modified set of the second plurality of Fourier series coefficients. The notch gate 58 deletes, at each selected band of frequencies, within the spectrum of the second plurality of Fourier series coefficients, a subset of the second plurality of Fourier series coefficients to generate the modified set of the second plurality of Fourier series coefficients. Further, the FFT module 59 generates from the second modified set of the second plurality of Fourier series coefficients the second spreading signal, and the despreading means despreads the received spread-spectrum signal with the first spreading signal and the second spreading signal.

Despreading with the first spreading signal and the second spreading signal might be accomplished by having a switching device which outputs a first set of bits, a second set of bits, a third set of bits, and a fourth set of bits, depending on the sense of spread signals coming from the received spread-spectrum signal. Thus, by way of example, when the received spread-spectrum signal has a first spreading signal, the switching device might output the first set of bits. When the received spread-spectrum signal has a complement of the first spreading signal, the switching device outputs a second pair of bits. When the received spread-spectrum signal has a second spreading signal, the switching device outputs the third set of bits. When the received spread-spectrum has a complement of the second spreading signal, the switching device outputs the fourth set of bits. The switching between the first spreading signal, complement of the first spreading signal, second spreading signal and complement of the second spreading signal, is done at the data rates of the message, not the switching rates of the PN sequences.

Alternatively, if complements of the first spreading signal and complement of the second spreading signal were not to be used, the switching device might output a 1-bit when the received spread-spectrum has a first spreading signal and output a 0-bit when the received spread-spectrum signal has the second spreading signal.

Similarly, referring to FIG. 5, the first spreading signal, complement of the first spreading signal, second spreading signal, and complement of the second spreading signal, or equivalently the first modified set of Fourier series coefficients, and second modified set of Fourier series coefficients can be stored in memory 50, and outputted to the switching device as previously described.

The concept may be extended to any number of PN sequences. Thus, by way of example, for using a third PN sequence and a fourth PN sequence, a third plurality of Fourier series coefficients and a fourth plurality of Fourier series coefficients could be generated. The notch gate 58 generates a third modified set of Fourier series coefficients from the third plurality of Fourier series coefficients by deleting, at each selected band of frequencies, a subset of the third plurality of Fourier series coefficients. A third spreading signal is generated from the third modified set of Fourier series coefficients using FFT module 59. Similarly, the notch gate 58 generates a fourth modified set of Fourier series coefficients from the fourth plurality of Fourier series coefficients by deleting, at each selected band of frequencies, a subset of the fourth plurality of Fourier series coefficients. The FFT module 59 generates a fourth spreading signal from the fourth modified set of Fourier series coefficients.

Depending on whether the received spread-spectrum signal has, at any point in time, the first spreading signal, the second spreading signal, the third spreading signal, and the fourth spreading signal, the switching device can output, in response to any of these spreading signals, a first set of bits, a second set of bits, a third set of bits, a fourth set of bits, a fifth set of bits, a sixth set of bits, a seventh set of bits or an eighth set of bits. Assuming that the sets of bits each include three bits, one might have: a first set of bits; a second set of bits which are different from the first set of bits; a third set of bits which are different from the first set of bits and the second set of bits; a fourth set of bits which are different from the first set of bits, the second bits and the third set of bits; a fifth set of bits which are different from the first set of bits, the second set of bits, the third set of bits and the fourth set bits; a sixth set of bits which are different from the first set of bits, the second set of bits, the third set of bits, the fourth set of bits, and the fifth set of bits; a seventh set of bits which are different from the first of bits, the second set of bits, the third set of bits, the fourth set of bits, the fifth set of bits and the sixth set of bits; and, an eighth set of bits which are different from the first set of bits, the second set of bits, the third set of bits, the fourth set of bits, the fifth set of bits, the sixth set of bits and the seventh set of bits. Thus, the switching device might output the first set of bits when the received spread-spectrum signal has the first spreading signal. When the received spread-spectrum signal has the complement of the first spreading sequence, the switching device might output the second set of bits. When the received spread-spectrum signal has the second spreading sequence, the switching device might output the third set of bits. When the received spread-spectrum signal has the complement of the second spreading sequence, the switching device outputs a fourth set of bits. When the received spread-spectrum signal has the third spreading sequence, the switching device outputs the fifth set of bits. When the received spread-spectrum signal has the complement of the third spreading signal, the switching device outputs the sixth set of bits. When the received spread-spectrum signal has the fourth spreading signal, the switching device outputs the sixth set of bits. When the received spread-spectrum signal has the complement of the fourth spreading signal, the switching device outputs the eight set of bits.

Alternatively, complements need not be used and a simpler system could be implemented by having the switching device output a first set of bits, i.e., a pair of bits, when the received spread-spectrum signal has the first spreading signal, output a second set of bits when the received spread-spectrum signal has the second spreading signal, output the third set of bits when the received spread-spectrum signal has the third spreading signal and output the fourth set of bits when the received spread-spectrum signal has the fourth spreading signal.

Figure 6:
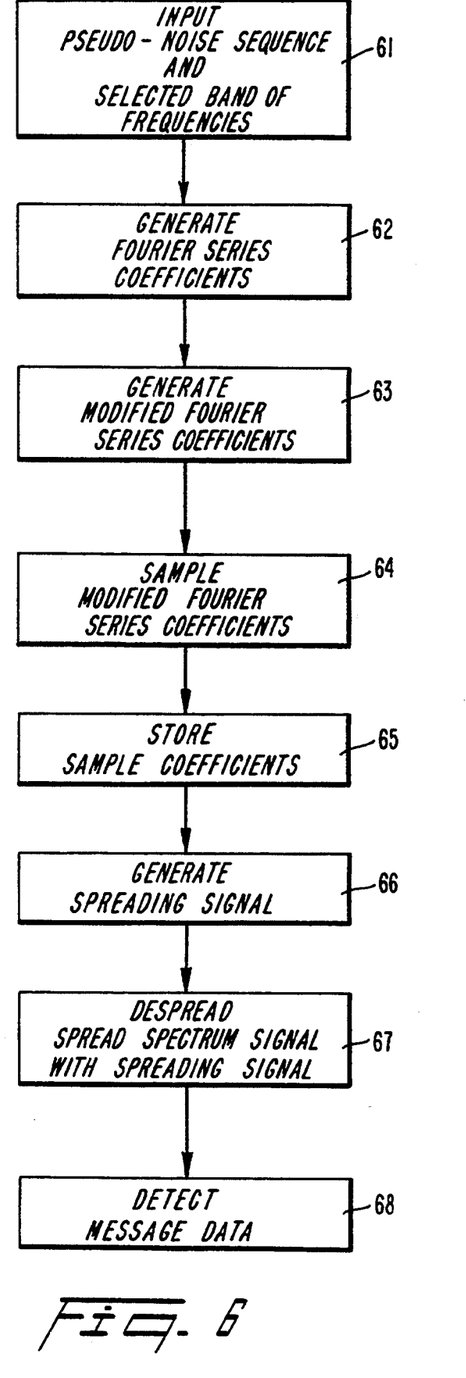
FIG. 6 is a flowchart of the receiving method.

As shown in FIG. 6, the present invention also includes a method for generating a spread-spectrum signal having a bandwidth with the spectrum within the bandwidth having at least one notch at a selected band of frequencies. The method broadly comprises the steps of inputting 61 a PN sequence, and inputting a selected band of frequencies which are to be notched. The method generates 62 a first plurality of Fourier series coefficients from the PN sequence, and generates 63 a first modified set of the first plurality of Fourier series coefficients. The modified set is generated 63 by deleting at each selected band of frequencies, a subset of the first plurality of Fourier series coefficients. The method optionally may sample 64 and store 65 the first modified set of Fourier series coefficients in a memory. The method generates 66 from the first modified set of Fourier series coefficients a spreading signal, and despreads 67 the received spread-spectrum signal with the first spreading signal. The despread spread-spectrum signal is detected 68 as the message, as previously described.

The method may be extended to using a second plurality of Fourier series coefficients or more as previously described.

Theory and Use of the Invention

The present invention can be viewed as generating the PN sequence from a multitone generator with spectral lines at a number of frequencies. The multitone generator can be employed since the PN sequence is periodic and the resulting waveform is bandlimited. Furthermore, to create a notch at a selected frequency or selected band of frequencies one needs only to delete the Fourier series coefficient, i.e., the tone, at that frequency, or tones within the band of frequencies. Equivalently, Fourier series coefficients could be generated for the frequencies outside the selected frequency or selected band of frequencies.

That such PN sequences exist presents a way of deriving the PN codes. It is shown that the cross correlation properties approaches asymptotically 1/L, where L is the number of chips in the code. In addition, the implementation of such codes is possible using one or two application specific integrated circuits (ASICs) thereby making such codes practical for CDMA applications.

Consider sending a short code so that $f_c/L = f_b$, i.e., the code repeats every $T_b$. Since $g(t)$ is periodic, $$g(t) = A_o + \sum_{l=1}^{L} A_l \cos\left(\frac{2\pi l t}{T_b} + \theta_l\right); \quad LT_c = T_b$$

Figure 7:
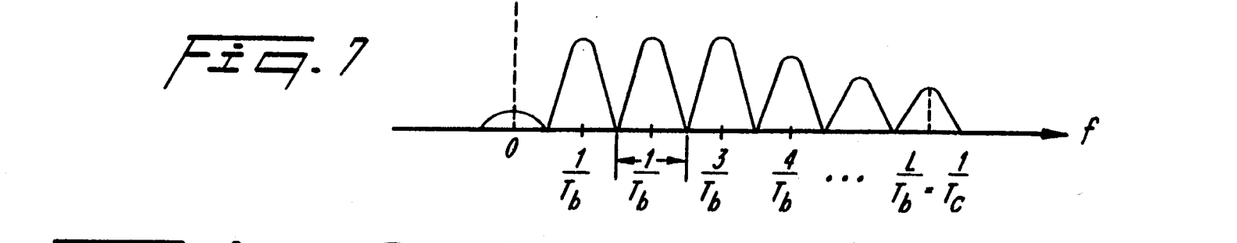
FIG. 7 illustrates spectrum of $d_f(t)g(t)$ for an ordinary PN sequence g(t), where the code of length repeats each $T_b$ i.e., $LT_c=T_b$.

Then $d_I(t)g(t)$, assuming QPSK and letting the bandwidth of $d_I(t)$ be $f_b$, can be represented in the frequency domain as shown in FIG. 7. The (sin X)/X nature of the spectrum of the PN sequence $g(t)$ results in each term having a different amplitude.

In order to synchronize the received waveform to the local oscillator, which is at a waveform delay $\tau$, i.e., $g(t-\tau)$, multiply $d_I(t)g(t)$ by $g(t-\tau)$ and integrate for a time $T_b$. The output is $$V_o(T_b) = d_I \int_O^{T_b} \left[A_o + \sum_{l=1}^{L} A_l \cos\left(\frac{2\pi l t}{T_b} + \theta_l\right)\right]$$

$$\left[A_o + \sum_{l=1}^{L} A_m \cos\left(\frac{2\pi m t}{T_b} - \frac{2\pi m \tau}{T_b} + \theta_m\right)\right]dt =$$

$$d_I T_b \left[\sum_{l=0}^{L} A_l^2 \cos\frac{2\pi l \tau}{T_b}\right]$$

Note that if $\tau = 0$, i.e., synchronization is achieved, then $$V_o(T_b) = d_I T_b \left[\sum_{l=0}^{T_b} A_l^2\right]$$

and total power $= g^2(t) = 1$

If $\tau = T_c = T_b/L$, then $$V_o(T_b) = d_I T_b \left[\sum_{l=0}^{L} A_l^2 \cos\left(2\pi \frac{l}{L}\right)\right]$$

and if $A_l^2 = \text{const} = A_c^2$ for all L $V_o(T_b) = d_I T_b L A_c^2$. To consider the cross correlation, note that $$V_o(T_b) =$$

$$d_I \int_O^{T_b} \left[A_o + \sum_{l=1}^{L} A_l \cos\left(\frac{2\pi l t}{T_b} + \theta_l\right)\right] \left[B_o + \sum_{m=1}^{L} B_l \cos\left(\frac{2\pi m t}{T_b} + \phi_m\right)\right]dt =$$

$$d_I T_b \left[A_o B_o + \sum_{l=1}^{L} \frac{1}{2}(A_l B_l)\cos(\theta_l - \phi_l)\right]$$

A good set of PN sequences adjusts, $A_i$, $B_i$, $\theta_i$, and $\phi_i$ such that $|V_0(T_b)|^2$ is a minimum. The coefficients of actual PN sequences can be used, or a special set may be derived.

Referring to FIG. 7, any interference in the received waveform modifying $A_l$ or $\theta_l$ affects the recombining process. Note that setting $A_l = 0$ affects only 1 of L terms, i.e., the $L^{th}$ order frequency diversity.

The above equation shows that even if all $A_i = B_i = A = B$, $i > 0$, and $\theta_l > \phi_l$, ..., and becomes $$V_o(T_b) \approx d_I T_b \left[A_o B_o + \frac{1}{2} AB \sum_{l=1}^{L} \cos(\theta_l - \phi_l)\right] = d_I T_b A_o^2$$

Note from the above equations that for $A_i = B_i = $ constant over the desired frequency range is optimum in the sense that maximum frequency diversity is achieved.

Observation

Construct a sequence $g_i(t)$ such that $A_o = 0$ and all $A_i$ equals a constant, $A_1$. Assume the code repeats every $T_b$. Then $$g_i(t) = \sum_{l=1}^{N} A_1 \cos\left(\frac{2\pi l}{T_b} t + \phi_{il}\right)$$

Let each sequence have the same amplitudes $A_1$ and the sequences are differentiated by their N phases $\phi_{il}$, then $$V_o = \int_O^{T_b} g_i^2(t)dt = T_b\left(\frac{1}{2}\sum_{l=1}^{N} A_1^2\right) = \left(\frac{NA_1^2}{2}\right)T_b$$

$$V_1 = \int_O^{T_b} g_i(t)g_i(t+\tau)dt = \int_O^{T_b} dt \sum_{l=1}^{N} A_1\cos\left(\frac{2\pi l t}{T_b} + \phi_{il}\right)$$

$$\sum_{m=1}^{N} A_1 \cos\left(\frac{2\pi m t}{T_b} + \phi_{im} + \frac{2\pi m \tau}{T_b}\right) =$$

-continued $$T_b \frac{T_b A_1^2}{2} \sum_{l=1}^{N} \cos \frac{2\pi l\tau}{T_b} \Bigg]$$

if $\phi_{il}$ are properly selected. Then $$\frac{V_1}{V_0} = \frac{1}{N} \sum_{l=1}^{N} \frac{\cos 2\pi l\tau}{T_b}$$

Now consider two sequences $g_1(t)$ and $g_2(t)$. Then $$V_2(T_b) =$$

$$\int_O^{T_b} g_1(t)g_2(t)dt = \int_O^{T_b} dt \left[ \sum_{l=1}^{N} A_1 \cos\left(\frac{2\pi lt}{T_b} + \phi_l\right) \right] \cdot$$

$$\left[ \sum_{m=1}^{N} A_1 \cos\left(\frac{2\pi mt}{T_b} + \theta_m\right) \right] = \frac{1}{2} A_1^2 T_b \sum_{l=1}^{N} \cos(\phi_l - \theta_l)$$

Choose $\phi_l - \theta_l$ so that
Then
Let $$\sum_{l=1}^{N} \cos(\phi_l - \theta_l) = O$$

$$V_2(T_b) = 0$$

$$\phi_l - \theta_l = \phi_l = \left(\frac{2\pi a}{N}\right) l; a = 1,2,3,\ldots$$

Then the above equation is satisfied.

Procedure Select a sequence:

$$g_i(t) = \sum_{l=1}^{N} \cos\left(\frac{2\pi lt}{T_b} + \phi_{il}\right), T_c = T_b/N$$

such that $$\phi_{il} - \phi_{jl} = \frac{\alpha 2\pi l}{N}; \text{ for } i \neq j; \alpha = 1,2,3,\ldots$$

Example:

$$\phi_{1l} = 0; \phi_{2l} = \frac{2\pi l}{N}; \phi_{3l} = \frac{4\pi l}{N}; \ldots$$

$$g_1(t) = \sum_{l=1}^{N} \cos \frac{2\pi lt}{T_b}$$

$$g_2(t) = \sum_{l=1}^{N} \cos \frac{2\pi l}{T_b}(t + T_c)$$

$$g_3(t) = \sum_{l=1}^{N} \cos \frac{2\pi l}{T_b}(t + 2T_c)$$

$$\int_O^{T_b} g_1^2(t)dt = \frac{N}{2} T_b$$

$$\int_O^{T_b} g_1(t)g_1(t + \tau)dt = \frac{N}{2} T_b \sum_{l=1}^{N} \cos \frac{2\pi lt}{T_b}$$

-continued $$\int_O^{T_b} g_1(t)g_2(t)dt = \frac{N}{2} T_b \sum_{l=1}^{N} \cos \frac{2\pi l}{N}$$

If the code is "long", i.e., $T_c > T_b$, $$g_i(t) = \sum_{l=1}^{L} \cos\left(\frac{2\pi lt}{LT_c} + \phi_{il}\right)$$

Then $$\int_O^{T_b} g_i^2(t)dt = \frac{L}{2} T_b$$

$$\int_O^{T_b} g_i(t)g_i(t + \tau)dt = \frac{LT_b}{2} \sum_{l=1}^{L} \cos \frac{2\pi l\tau}{LT_c}$$

$$\int_O^{T_b} g_j(t)g_i(t)dt = \frac{LT_b}{2} \sum_{l=1}^{L} \cos(\phi_{jl} - \phi_{il}) = 0$$

Thus, the sequences are orthogonal if $$\phi_{jl} - \phi_{il} = \frac{2\pi a_l}{L}$$

Diversity

Figure 8:
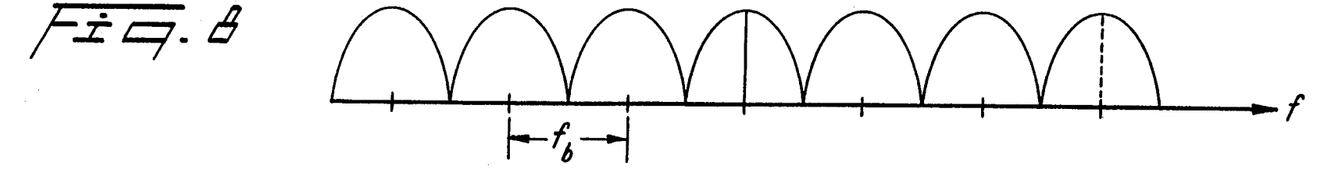
FIG. 8 illustrates spectrum of a modulated spreading sequence when L=K Fourier amplitude coefficients set to 1, $C_n=1$, spread-spectrum signal bandlimited to B.
Figure 9:
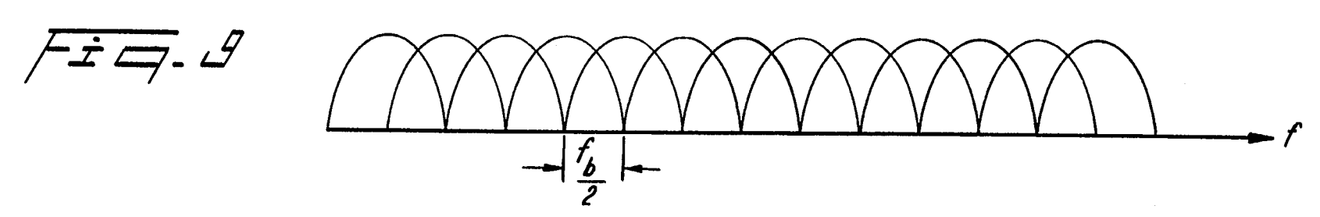
FIG. 9 illustrates spectrum of a modulated spreading sequence when L=2K and $C_n=1$, spread-spectrum signal bandlimited to B.
Figure 10:
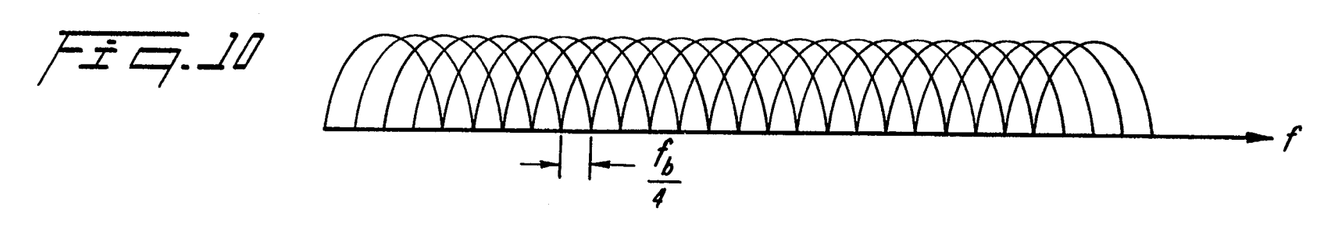
FIG. 10 illustrates spectrum of a modulated spreading sequence when L=4K and $C_n=1$, spread-spectrum signal bandlimited to B.

If the codes are "short" then the spectrum of the modulated code is as shown in FIG. 8. The spectra for longer codes are shown in FIGS. 9 and 10.

Note that as the code length increases, a jammer of bandwidth b interferes with a longer number of code carriers but the total percentages stays constant. In FIG. 8, let one of $K = f_c/f_b$ modulated tones be jammed. In FIG. 9, two of 2K modulated tones are jammed. In FIG. 10, 4 of 4K modulated tones are jammed. The ratio remains the same, $1/K$.

Number of Codes

The number of codes depends on the number of independent phases. Thus $g_1$: 0

$g_2$: $\frac{2\pi}{L}, \frac{4\pi}{L}, \frac{6\pi}{L}, \ldots$ $g_3$: $\frac{4\pi}{L}, \frac{8\pi}{L}, \frac{12\pi}{L}, \ldots$ $g_{L+1}$: $2\pi, 4\pi, 6\pi, \ldots$ Therefore $g_1 = g_{L+1}$ and $g_{L+1}$ cannot be a code. There are then L codes.

Cross Correlation

We note that $g_1$ and $g_2$, $g_1$ and $g_3$, $g_1$ and $g_j$ correlate with the $L^{th}$ term:

$g_1 = 0$, $g_2(l=L) = 2\pi$, $g_3(l=L) = 4\pi$ resp.

Whenever $g_i(l) = g_j(l)$ there is a cross correlation between the two codes. Since each tone $l = 1, 2, \ldots, L$ contains $1/L$ of the total power, as the number of cross correlations increases, so does the power in the cross correlation.

If L is selected to be a prime number, then there is only a single cross correlation tone, at the $L^{th}$ term.

Code Generation

One of many ways to generate $g_i(t)$ is to use an FFT approach. Since the spectrum is known, a single FFT, transforms the spectrum into the time domain.

FIGS. 1, 2, 4 and 5 show a possible implementation of the transmitter and receiver. FIG. 1 shows that the transmitter has all 1's checked into the gate from the magnitude circuit, while the phase circuit uses a PROM to generate the appropriate phase pattern. The 1's and corresponding phase angles are clocked together. The gate deletes the appropriate tones and the resultant is converted into the time domain. The resulting $g_i(t)$, an analog signal, is then sampled and stored in RAM. The RAM is then mixed with the data, up converted and transmitted.

It will be apparent to those skilled in the art that various modifications can be made to the notch filtering spread spectrum signals of the instant invention without departing from the scope or spirit of the invention, and it is intended that the present invention cover modifications and variations of the spread spectrum notch filtering provided they come within the scope of the appended claims and their equivalents.

I claim:

1. A method for generating, from a first pseudo-noise (PN) sequence, a spread-spectrum signal having a bandwidth, with spectrum within the bandwidth having at least one notch at a selected band of frequencies, comprising the steps of:

generating a first plurality of Fourier series coefficients from the PN sequence;

generating a first modified set of the first plurality of Fourier series coefficients by deleting, corresponding to each selected band of frequencies, a subset of the first plurality of Fourier series coefficients;

generating, from the first modified set of Fourier series coefficients a first spreading signal; and transmitting the spread-spectrum-processed message data as the spread-spectrum signal over a communications channel.

2. The method as set forth in claim 1 wherein the step of generating the first plurality of Fourier series coefficients includes the step of generating the first plurality of Fourier series coefficients with each coefficient having a magnitude and phase value.

3. The method as set forth in claim 1 wherein the step of generating the first plurality of Fourier series coefficients includes the step of generating the first plurality of Fourier series coefficients with each coefficient having an in-phase value and a quadrature value.

4. The method as set forth in claim 1 wherein the step of spread-spectrum processing includes the step of modulo adding the message data with the first spreading signal.

5. The method as set forth in claim 1 wherein the step of spread-spectrum processing includes the step of multiplying the message data with the first spreading signal.

6. The method as set forth in claim 1 wherein the step of spread-spectrum processing includes the steps of:

outputting, in response to the message data having a 1-bit, the first spreading signal; and outputting, in response to the message data having a 0-bit, a complement of the first spreading signal.

7. The method as set forth in claim 1 further including the steps of:

sampling the first spreading signal;

storing the sampled first spreading signal; and wherein the step of spread-spectrum processing includes spread-spectrum processing message data with the stored sampled first spreading signal.

8. The method as set fourth in claim 1 further including the steps of:

generating from a second PN sequence a second plurality of Fourier series coefficients;

generating a second modified set of the second plurality of Fourier series coefficients by deleting, corresponding to each selected band of frequencies, a subset of the second plurality of Fourier series coefficients;

generating from the second modified set of Fourier series coefficients a second spreading signal; and wherein the step of spread-spectrum processing includes spread-spectrum processing message data with the sampled first spreading signal and the sampled second spreading signal.

9. The method as set forth in claim 7 wherein the step of spread-spectrum processing includes the steps of:

outputting, in response to the message data having a first pair of bits, the first spreading signal;

outputting, in response to the message data having a second pair of bits, with the second pair of bits different from the first pair of bits, a complement of the first spreading signal;

outputting, in response to the message data having a third pair of bits, with the third pair of bits different from the first pair of bits and the second pair of bits, the second spreading signal;

outputting, in response to the message data having a fourth pair of bits, with the fourth pair of bits different from the first pair of bits, the second pair of bits and the third pair of bits, a complement of the second spreading signal.

10. The method as set forth in claim 7 wherein the step of spread-spectrum processing includes the steps of:

outputting, in response to the message data having a 1-bit, the first spreading signal; and outputting, in response to the message data having a 0-bit, the second spreading signal.

11. The method as set forth in claim 4 further including the steps of:

generating from a third PN sequence a third plurality of Fourier series coefficients;

generating from a fourth PN sequence a fourth plurality of Fourier series coefficients;

generating a third modified set of the third plurality of Fourier series coefficients by deleting, corresponding to each selected band of frequencies, a subset of the third plurality of Fourier series coefficients;

generating from the third modified set of Fourier series coefficients a third spreading signal;

generating a fourth modified set of the fourth plurality of Fourier series coefficients by deleting, corresponding to each selected band of frequencies, a subset of the fourth plurality of Fourier series coefficients;

generating from the fourth modified set of Fourier series coefficients a fourth spreading signal; and wherein the step of spread-spectrum processing includes spread-spectrum processing message data with the first spreading signal, the second spreading signal, the third spreading signal, and the fourth spreading signal.

12. The method as set forth in claim 11 wherein the step of spread-spectrum processing includes the steps of:
outputting, in response to the message data having a first set of bits, the first spreading signal;
outputting, in response to the message data having a second set of bits, with the second set of bits different from the first set of bits, a complement of the first spreading signal;
outputting, in response to the message data having a third set of bits, with the third set of bits different from the first set of bits and the second set of bits, the second spreading signal;
outputting, in response to the message data having a fourth set of bits, with the fourth set of bits different from the first set of bits, the second set of bits and the third set of bits, a complement of the second spreading signal;
outputting, in response to the message data having a fifth set of bits, with the fifth set of bits different from the first set of bits, the second set of bits, the third set of bits and the fourth set of bits, the third spreading signal;
outputting, in response to the message data having a sixth set of bits, with the sixth set of bits different from the first set of bits, the second set of bits, the third set of bits, the fourth set of bits and the fifth set of bits, a complement of the third spreading signal;
outputting, in response to the message data having a seventh set of bits, with the seventh set of bits different from the first set of bits, the second set of bits, the third set of bits, the fourth set of bits, the fifth set of bits and the sixth set of bits, the fourth spreading signal; and
outputting, in response to the message data having an eighth set of bits, with the eighth set of bits different from the first set of bits, the second set of bits, the third set of bits, the fourth set of bits, the fifth set of bits, the sixth set of bits and the seventh set of bits, and complement of the fourth spreading signal.

13. The method as set forth in claim 11 wherein the step of spread-spectrum processing includes the steps of:
outputting, in response to the message data having a first set of bits, the first spreading signal;
outputting, in response to the message data having a second set of bits, with the second set of bits different from the first set of bits, the second spreading signal;
outputting, in response to the message data having a third set of bits, with the third set of bits different from the first set of bits and the second set of bits, the third spreading signal; and
outputting, in response to the message data having a fourth set of bits, with the fourth set of bits different from the first set of bits, the second set of bits, and the third set of bits, the fourth spreading signal.

14. A method using a first modified set of a first plurality of Fourier series coefficients, for generating a spread-spectrum signal having a bandwidth with spectrum within the bandwidth having at least one notch at a selected band of frequencies, with the first modified set of the first plurality of Fourier series coefficients generated from a first plurality of Fourier series coefficients of a first pseudo-noise (PN) sequence by deleting, corresponding to each selected band of frequencies, a subset of the first plurality of Fourier series coefficients, the method comprising the steps of:
generating from the first modified set of Fourier series coefficients a first spreading signal;
spread-spectrum processing message data with the first spreading signal; and
transmitting the spread-spectrum processed message data as the spread-spectrum signal over a communications channel.

15. The method as set forth in claim 14 wherein the step of spread-spectrum processing includes the step of modulo adding the message data with the first spreading signal.

16. The method as set forth in claim 14 wherein the step of spread-spectrum processing includes the step of multiplying the message data with the first spreading signal.

17. The method as set forth in claim 14 further including the steps of:
sampling the first spreading signal;
storing the sampled first spreading signal; and
wherein the step of spread-spectrum processing includes spread-spectrum processing message data with the stored sampled first spreading signal.

18. The method as set forth in claim 14 wherein the step of spread-spectrum processing includes the steps of:
outputting, in response to the message data having a 1-bit, the first spreading signal; and
outputting, in response to the message data having a 0-bit, a complement of the first spreading signal.

19. The method as set fourth in claim 14 using a second modified set of a second plurality of Fourier series coefficients, for generating the spread-spectrum signal with the bandwidth having at least one notch at the selected band of the frequencies, with the second modified set of the second plurality of Fourier series coefficients generated from the second plurality of Fourier series coefficients of a second PN sequence by deleting, corresponding to each selected band of frequencies, a subset of the second plurality of Fourier series coefficients, further including the steps of:
generating from the second modified set of Fourier series coefficients a second spreading signal; and
wherein the step of spread-spectrum processing includes spread-spectrum processing message data with the first spreading signal and the second spreading signal.

20. The method as set forth in claim 19 wherein the step of spread-spectrum processing includes the steps of:
outputting, in response to the message data having a first pair of bits, the first spreading signal;
outputting, in response to the message data having a second pair of bits, with the second pair of bits different from the first pair of bits, a complement of the first spreading signal;
outputting, in response to the message data having a third pair of bits, with the third pair of bits different from the first pair of bits and the second pair of bits, the second spreading signal;
outputting, in response to the message data having a fourth pair of bits, with the fourth pair of bits different from the first pair of bits, the second pair of bits and the third pair of bits, a complement of the second spreading signal.

21. The method as set forth in claim 19 wherein the step of spread-spectrum processing includes the steps of:

outputting, in response to the message data having a 1-bit, the first spreading signal; and outputting, in response to the message data having a 0-bit, the second spreading signal.

22. The method as set forth in claim 15 using a third modified set of a third plurality of Fourier series coefficients and a fourth modified set of a fourth plurality of Fourier series coefficients, for generating the spread-spectrum signal with the bandwidth having at least one notch at the selected band of frequencies, with the third modified set of the third plurality of Fourier series coefficients generated from the third plurality of Fourier series coefficients of a third PN sequence by deleting, corresponding to each selected band of frequencies, a subset of the third plurality of Fourier series coefficients, with the fourth modified set of the fourth plurality of Fourier series coefficients generated from the fourth plurality of Fourier series coefficients of a fourth PN sequence by deleting, corresponding to each selected band of frequencies, a subset of the fourth plurality of Fourier series coefficients, further including the steps of:

generating from the third modified set of Fourier series coefficients a third spreading signal;

generating from the fourth modified set of Fourier series coefficients a fourth spreading signal; and wherein the step of spread-spectrum processing includes spread-spectrum processing message data with the first spreading signal, the second spreading signal the third spreading signal, and the fourth spreading signal.

23. The method as set forth in claim 22 wherein the step of spread-spectrum processing includes the steps of:

outputting, in response to the message data having a first set of bits, the first spreading signal;

outputting, in response to the message data having a second set of bits, with the second set of bits different from the first set of bits, a complement of the first spreading signal;

outputting, in response to the message data having a third set of bits, with the third set of bits different from the first set of bits and the second set of bits, the second spreading signal;

outputting, in response to the message data having a fourth set of bits, with the fourth set of bits different from the first set of bits, the second set of bits and the third set of bits, a complement of the second spreading signal;

outputting, in response to the message data having a fifth set of bits, with the fifth set of bits different from the first set of bits, the second set of bits, the third set of bits and the fourth set of bits, the third spreading signal;

outputting, in response to the message data having a sixth set of bits, with the sixth set of bits different from the first set of bits, the second set of bits, the third set of bits, the fourth set of bits and the fifth set of bits, a complement of the third spreading signal;

outputting, in response to the message data having a seventh set of bits, with the seventh set of bits different from the first set of bits, the second set of bits, the third set of bits, the fourth set of bits, the fifth set of bits and the sixth set of bits, the fourth spreading signal; and outputting, in response to the message data having an eighth set of bits, with the eighth set of bits different from the first set of bits, the second set of bits, the third set of bits, the fourth set of bits, the fifth set of bits, the sixth set of bits and the seventh set of bits, and complement of the fourth spreading signal.

24. The method as set forth in claim 22 wherein the step of spread-spectrum processing includes the steps of:

outputting, in response to the message data having a first set of bits, the first spreading signal;

outputting, in response to the message data having a second set of bits, with the second set of bits different from the first set of bits, the second spreading signal;

outputting, in response to the message data having a third set of bits, with the third set of bits different from the first set of bits and the second set of bits, the third spreading signal; and outputting, in response to the message data having a fourth set of bits, with the fourth set of bits different from the first set of bits, the second set of bits, and the third set of bits, the fourth spreading signal.

25. An apparatus for transmitting, from a first pseudo-noise (PN) sequence, a spread-spectrum signal having a bandwidth, with spectrum within the bandwidth having at least one notch at a selected band of frequencies, comprising:

means for generating a first plurality of Fourier series coefficients from the PN sequence;

means for generating a first modified set of the first plurality of Fourier series coefficients by deleting, corresponding to each selected band of frequencies, a subset of the first plurality of Fourier series coefficients;

means for generating from the first modified set of Fourier series coefficients a first spreading signal;

means for spread-spectrum processing message data with the first spreading signal; and means for transmitting the spread-spectrum-processed message data as the spread-spectrum signal over a communications channel.

26. The transmitter as set forth in claim 25 wherein said means for generating the first plurality of Fourier series coefficients includes means for generating the first plurality of Fourier series coefficients with each coefficient having a magnitude and phase value.

27. The transmitter as set forth in claim 25 wherein said means for generating the first plurality of Fourier series coefficients includes means for generating the first plurality of Fourier series coefficients with each coefficient having an inphase value and a quadrature value.

28. The transmitter as set forth in claim 25 wherein said means for spread-spectrum processing includes means for modulo adding the message data with the first spreading signal.

29. The transmitter as set forth in claim 25 wherein said means for spread-spectrum processing includes means for multiplying the message data with the first spreading signal.

30. The transmitter as set forth in claim 25 wherein said means for spread-spectrum processing includes:

means, responsive to the message data having a 1-bit, for outputting the first spreading signal; and said means, responsive to the message data having a 0-bit, for outputting a complement of the first spreading signal.

31. The transmitter as set fourth in claim 25 further including:

means for generating from a second PN sequence a second plurality of Fourier series coefficients;

means for generating a second modified set of the second plurality of Fourier series coefficients by deleting, corresponding to each selected band of frequencies, a subset of the second plurality of Fourier series coefficients;

means for generating from the second modified set of Fourier series coefficients a second spreading signal; and wherein said spread-spectrum processing means includes means for spread-spectrum processing message data with the first spreading signal and the second spreading signal.

32. The transmitter as set forth in claim 31 wherein said spread-spectrum processing means includes means, responsive to the message data having a first pair of bits, for outputting the first spreading signal, responsive to the message data having a second pair of bits, with the second pair of bits different from the first pair of bits, for outputting a complement of the first spreading signal, responsive to the message data having a third pair of bits, with the third pair of bits different from the first pair of bits and the second pair of bits, the second spreading signal, responsive to the message data having a fourth pair of bits, with the fourth pair of bits different from the first pair of bits, the second pair of bits and the third pair of bits, for outputting a complement of the second spreading signal.

33. The transmitter as set forth in claim 31 wherein said spread-spectrum processing means includes means, responsive to the message data having a 1-bit, for outputting the first spreading signal, responsive to the message data having a 0-bit, for outputting the second spreading signal.

34. The transmitter as set forth in claim 28 further including:

means for generating from a third PN sequence a third plurality of Fourier series coefficients;

means for generating from a fourth PN sequence a fourth plurality of Fourier series coefficients;

means for generating a third modified set of the third plurality of Fourier series coefficients by deleting, corresponding to each selected band of frequencies, a subset of the third plurality of Fourier series coefficients;

means for generating from the third modified set of Fourier series coefficients a third spreading signal;

means for generating a fourth modified set of the fourth plurality of Fourier series coefficients by deleting, corresponding to each selected band of frequencies, a subset of the fourth plurality of Fourier series coefficients;

means for generating from the fourth modified set of Fourier series coefficients a fourth spreading signal; and wherein said spread-spectrum processing means includes means for spread-spectrum processing message data with the first spreading signal, the second spreading signal, the third spreading signal, and the fourth spreading signal.

35. The transmitter as set forth in claim 34 wherein said spread-spectrum processing means includes means, responsive to the message data having a first set of bits, for outputting the first spreading signal, responsive to the message data having a second set of bits, with the second set of bits different from the first set of bits, for outputting a complement of the first spreading signal, responsive to the message data having a third set of bits, with the third set of bits different from the first set of bits and the second set of bits, for outputting the second spreading signal, responsive to the message data having a fourth set of bits, with the fourth set of bits different from the first set of bits, the second set of bits and the third set of bits, for outputting a complement of the second spreading signal, responsive to the message data having a fifth set of bits, with the fifth set of bits different from the first set of bits, the second set of bits, the third set of bits and the fourth set of bits, for outputting the third spreading signal, responsive to the message data having a sixth set of bits, with the sixth set of bits different from the first set of bits, the second set of bits, the third set of bits, the fourth set of bits and the fifth set of bits, for outputting a complement of the third spreading signal, responsive to the message data having a seventh set of bits, with the seventh set of bits different from the first set of bits, the second set of bits, the third set of bits, the fourth set of bits, the fifth set of bits and the sixth set of bits, for outputting the fourth spreading signal and, responsive to the message data having an eighth set of bits, with the eighth set of bits different from the first set of bits, the second set of bits, the third set of bits, the fourth set of bits, the fifth set of bits, the sixth set of bits and the seventh set of bits, and for outputting a complement of the fourth spreading signal.

36. The transmitter as set forth in claim 34 wherein said spread-spectrum processing means includes means, responsive to the message data having a first set of bits, for outputting the first spreading signal, responsive to the message data having a second set of bits, with the second set of bits different from the first set of bits, for outputting the second spreading signal, responsive to the message data having a third set of bits, with the third set of bits different from the first set of bits and the second set of bits, for outputting the third spreading signal and, responsive to the message data having a fourth set of bits, with the fourth set of bits different from the first set of bits, the second set of bits, and the third set of bits, for outputting the fourth spreading signal.

37. A transmitter using a first modified set of a first plurality of Fourier series coefficients, for generating a spread-spectrum signal having a bandwidth with the bandwidth having at least one notch at a selected band of frequencies, with the first modified set of the first plurality of Fourier series coefficients generated from a first plurality of Fourier series coefficients of a first pseudo-noise (PN) sequence by deleting, corresponding to each selected band of frequencies, a subset of the first plurality of Fourier series coefficients, said transmitter comprising:

a signal generator for generating from the first modified set of Fourier series coefficients a first spreading signal;

a spreader coupled to said signal generator for spread-spectrum processing message data with the first spreading signal; and an antenna coupled to said spreader for transmitting the spread-spectrum processed message data as the spread-spectrum signal over a communications channel.

38. The transmitter as set forth in claim 37 wherein said spread-spectrum processing means includes means for modulo adding the message data with the first spreading signal.

39. The transmitter as set forth in claim 37 wherein said spread-spectrum processing means includes means for multiplying the message data with the first spreading signal.

40. The transmitter as set forth in claim 37 wherein said spread-spectrum processing means includes means, responsive to the message data having a 1-bit, for outputting the first spreading signal, and responsive to the message data having a 0-bit, for outputting a complement of the first spreading signal.

41. The transmitter as set fourth in claim 37 using a second modified set of a second plurality of Fourier series coefficients, for generating the spread-spectrum signal with the bandwidth having at least one notch at the selected band of the frequencies, with the second modified set of the second plurality of Fourier series coefficients generated from the second plurality of Fourier series coefficients of a second PN sequence by deleting, corresponding to each selected band of frequencies, a subset of the second plurality of Fourier series coefficients, further including the steps of:

a fast Fourier transform for generating from the second modified set of Fourier series coefficients a second spreading signal; and wherein said spreader circuit spread-spectrum processing message data with the first spreading signal and the second spreading signal.

42. The transmitter as set forth in claim 41 wherein said spreader circuit includes circuitry, responsive to the message data having a first pair of bits, the first spreading signal, responsive to the message data having a second pair of bits, with the second pair of bits different from the first pair of bits, for outputting a complement of the first spreading signal, responsive to the message data having a third pair of bits, with the third pair of bits different from the first pair of bits and the second pair of bits, for outputting the second spreading signal, responsive to the message data having a fourth pair of bits, with the fourth pair of bits different from the first pair of bits, the second pair of bits and the third pair of bits, for outputting a complement of the second spreading signal.

43. The transmitter as set forth in claim 41 wherein said spreader circuit includes circuitry, responsive to the message data having a 1-bit, for outputting the first spreading signal and, responsive to the message data having a 0-bit, for outputting the second spreading signal.

44. The transmitter as set forth in claim 38 using a third modified set of a third plurality of Fourier series coefficients and a fourth modified set of a fourth plurality of Fourier series coefficients, for generating the spread-spectrum signal with the bandwidth having at least one notch at the selected band of frequencies, with the third modified set of the third plurality of Fourier series coefficients generated from the third plurality of Fourier series coefficients of a third PN sequence by deleting, corresponding to each selected band of frequencies, a subset of the third plurality of Fourier series coefficients, with the fourth modified set of the fourth plurality of Fourier series coefficients generated from the fourth plurality of Fourier series coefficients of a fourth PN sequence by deleting, corresponding to each selected band of frequencies, a subset of the fourth plurality of Fourier series coefficients, said transmitter further including:

generating from the third modified set of Fourier series coefficients a third spreading signal;

generating from the fourth modified set of Fourier series coefficients a fourth spreading signal; and wherein said spreader circuit includes spread-spectrum processing message data with the first spreading signal, the second spreading signal the third spreading signal, and the fourth spreading signal.

45. The transmitter as set forth in claim 44 wherein the step of spread-spectrum processing includes:

outputting, in response to the message data having a first set of bits, the first spreading signal;

outputting, in response to the message data having a second set of bits, with the second set of bits different from the first set of bits, a complement of the first spreading signal;

outputting, in response to the message data having a third set of bits, with the third set of bits different from the first set of bits and the second set of bits, the second spreading signal;

outputting, in response to the message data having a fourth set of bits, with the fourth set of bits different from the first set of bits, the second set of bits and the third set of bits, a complement of the second spreading signal;

outputting, in response to the message data having a fifth set of bits, with the fifth set of bits different from the first set of bits, the second set of bits, the third set of bits and the fourth set of bits, the third spreading signal;

outputting, in response to the message data having a sixth set of bits, with the sixth set of bits different from the first set of bits, the second set of bits, the third set of bits, the fourth set of bits and the fifth set of bits, a complement of the third spreading signal;

outputting, in response to the message data having a seventh set of bits, with the seventh set of bits different from the first set of bits, the second set of bits, the third set of bits, the fourth set of bits, the fifth set of bits and the sixth set of bits, the fourth spreading signal; and outputting, in response to the message data having an eighth set of bits, with the eighth set of bits different from the first set of bits, the second set of bits, the third set of bits, the fourth set of bits, the fifth set of bits, the sixth set of bits and the seventh set of bits, and complement of the fourth spreading signal.

46. The transmitter as set forth in claim 44 wherein the step of spread-spectrum processing includes:

outputting, in response to the message data having a first set of bits, the first spreading signal;

outputting, in response to the message data having a second set of bits, with the second set of bits different from the first set of bits, the second spreading signal;

outputting, in response to the message data having a third set of bits, with the third set of bits different from the first set of bits and the second set of bits, the third spreading signal; and outputting, in response to the message data having a fourth set of bits, with the fourth set of bits different from the first set of bits, the second set of bits, and the third set of bits, the fourth spreading signal.

* * * * *